Patented Jan. 24, 1939

2,145,149

UNITED STATES PATENT OFFICE 2,145,149

SATIN WHITE PIGMENT AND PROCESS OF MAKING SAME

Lincoln T. Work, New York, N. Y.

No Drawing. Application February 4, 1935,
Serial No. 4,988

3 Claims. (Cl. 134—58)

This invention relates to the production of a pigment, and is concerned more particularly with a white pigmentary composition containing satin white and a clay residue, which composition may be obtained through a series of chemical reactions herein described. The invention involves also the process by which this composition is prepared.

Satin white has been known for a great many years. It is produced by the reaction of calcium hydroxide with aluminum sulphate in aqueous solution. There appears to be considerable debate as to the exact chemical identity of this material, but the present general tendency is to accept the theory that the said substance consists essentially of tricalcium aluminate and calcium sulphate, both in hydrated form. The sulphoaluminate compound identified in Portland cement as the reaction product of calcium aluminate and calcium sulphate is not stressed as a product of this reaction. Preformed satin white may be blended with calcium carbonate or whiting, or it may be used alone.

One of the principal uses of this material is in coating compositions for preparing coated paper. In preparing paper coating compositions therefrom, sizing material is used with a paste of the satin white. Among the more recent developments in the production of satin white paper coating compositions are the uses of materials such as soaps, resin products, etc., which serve to disperse the satin white in the mixture. Some of these wetting agents make it possible to dry the satin white crystals although heretofore they have been handled as a thick paste.

According to the prior art the reaction between aluminum sulphate and lime has been well known for a great many years. The recent developments in the field of satin white manufacture have, for the most part, consisted in details of processing or treatment. For example, Ryan (U. S. Patent No. 1,470,765) produced the satin white in a paste form and eliminated grit therein by grinding the paste. Frederiksson (U. S. Patent No. 1,632,891) utilized basic aluminum sulphate for reaction with hydrated lime, at room temperature, to produce satin white as a thick paste. He considered the basic sulphate essential in the creation of the crystal nuclei which determine the ultimate character of the satin white. Lauderman (U. S. Patent No. 1,863,663) produced a mixed pigment while utilizing a by-product of calcium carbonate sludge from the caustic soda process. In this case excess lime was reacted with alum to produce the satin white in the presence of calcium carbonate.

It is well known that acid will react with clay to extract alumina, thus producing aluminum sulphate solution and an altered clay. However, the value of that altered clay as a component of a pigment composition has not, so far as I am aware, been mentioned in the prior art.

From the foregoing it is evident that the broad aspects of the prior art on satin white preparation are well known. The improvements herein described and claimed are largely specific in nature.

Having in mind the development of the prior art, it is an object of my invention to provide a mixed pigment, or pigment composition, consisting essentially of a clay substance or residue and satin white. Another object of invention is the provision of a pigment composition comprising satin white and chemically processed and altered clay. A further object is to provide a process for the production of such pigment composition.

The above, and other, objects of invention are attained by practicing a process which, generally considered, comprises reacting a clay with sulphuric acid in amount and concentration sufficient to convert at least the major proportion of alumina content of the clay into aluminum sulphate, whereby an aluminum sulphate solution and an insoluble sludge of clay residue are produced, and reacting the solution with hydrated lime in the presence, or absence, of clay residue sludge. A feature of the process is the precipitation of satin white in the presence of said clay residue sludge. According to the preferred embodiment of my invention I use as starting material a suitable paper clay, preferably one which is high in alumina content: this clay is treated with sulphuric acid to extract alumina, thereby producing a solution of aluminum sulphate. The solution may be, and preferably is, removed from the residual clay substance for purification, e. g., for freeing it from contained iron by the use of metallic aluminum. Correspondingly, the clay residue may be treated with fresh acid to secure a maximum amount of aluminum sulphate solution. Specific conditions for the reaction of the acid and the clay are well known, but for this purpose it is advisable to avoid the use of concentrated acid, as the latter has a tendency to char organic material which may be present in the clay. It should be noted that sulphuric acid of moderate strength tends to decompose any organic matter present in the clay. After the various steps are performed upon the solution and the clay residue, the two are again mixed, and hydrated lime added as a precipitant for the satin white. Or, the solution may be purified, the purified solution reacted with hydrated lime, and the resulting precipitate mixed with the clay residue.

The invention will be described more particularly with reference to the following example. 1 pound of clay of paper-coating grade is moistened with about 1 pound of water and .75 pound of $H_2SO_4$ monohydrate. The resulting mixture is held at a temperature of about 214° F. until the alumina content in the leaching mixture approaches the amount of available alumina of the clay, normally 20–30 percent. Assuming 25 percent alumina removed, the clay residue approximates .75 pound of special acid-treated mineral. The alum formed is approximately .85 pound. After the reaction is complete, the suspension is diluted to a slurry with water, and milk of lime slurry is added thereto to the extent of about 1.8 pounds of $Ca(OH)_2$. This yields approximately 4 pounds of satin white pigment composition when due allowance is made for the water of hydration in the compound. This pigment composition may be processed in paste form by the use of the ball or colloid mill, or by the use of dispersing agents. The resulting product, with or without such processing, is suitable for use with casein as a coating for calendered papers.

The above process is of particular interest when treating clays which are relatively free of iron or other coloring constituents soluble with the aluminum, or when such impurities are not objectionable in the product.

In carrying out this process on clay of normal purity for paper coating purposes, and with the object of producing a pigment composition of particularly high whiteness, I prefer to separate the acid solution from the clay residue insoluble therein, and to purify the solution by treating the same with metallic aluminum in quantity sufficient to remove therefrom iron and other coloring ingredients dissolved from the clay starting material. After this preferred step is practiced, the purified aluminum sulphate solution is returned to the clay residue, whereupon to the mixture is added that amount of hydrated lime necessary to effect the desired satin white reaction.

This invention offers two distinct advantages over present methods for the making of satin white pigment. First, the aluminum comes from a cheap source. By this process the aluminum sulphate is secured and purified in the solution without resort to the normal commercial procedure of crystallization. The avoidance of crystallization and the direct use of the solution represent an economy in the production of satin white. Second, the acid treatment of the clay leaves a residue improved in color through dissolution of iron and other coloring ingredients. Moreover, the clay has undergone a desirable alteration in structure through the extraction of the aluminum, which result makes the residue peculiarly advantageous because of its optical properties, the nature of its particle surfaces as a base for precipitation of satin white, and the desirable plastic properties imparted to the finished pigment composition.

The resulting satin white composition, accordingly, is a white pigment having desirable properties from the standpoints of plasticity and "covering power". The satin white composition consists of a homogeneous admixture of finely divided particles of acid-treated clay residue associated with satin white particles precipitated in the presence of the clay residue particles.

I claim:

1. Process which comprises treating finely divided clay with sulphuric acid, producing thereby a solution containing aluminum sulphate together with coloring impurities and an insoluble clay residue, removing coloring ingredients from the solution, and reacting the so-purified solution with hydrated lime in the presence of said clay residue.

2. Process which comprises treating finely divided iron-containing clay with sulphuric acid in an amount sufficient to convert at least a part of the alumina of the clay to aluminum sulphate, whereby there is produced a solution of aluminum sulphate containing iron sulphate and an acid-treated clay residue insoluble in said solution, separating the solution from the residue, treating the former with a precipitant for iron and separating and discarding the resulting iron precipitate, returning the so-purified aluminum sulphate solution to the clay residue, and reacting therewith hydrated lime in amount sufficient to precipitate satin white in the presence of particles of clay residue.

3. A pigment composition consisting essentially of finely divided particles of acid-treated clay residue and satin white particles precipitated in the presence of said clay residue particles.

LINCOLN T. WORK.